United States Patent [19]

Steingroever et al.

[11] Patent Number: 5,374,915
[45] Date of Patent: Dec. 20, 1994

[54] MAGNETIZING DEVICE FOR PERMANENT MAGNET RINGS THAT ARE BIPOLAR ON THE END FACES OR MULTIPOLAR ON THE LATERAL FACES

[75] Inventors: Erich Steingroever, Bonn; Dietrich Steingroever, Bergisch Gladbach, both of Germany

[73] Assignee: Magnet-Physik Dr. Steingroever GmbH, Germany

[21] Appl. No.: 40,841

[22] Filed: Mar. 31, 1993

[30] Foreign Application Priority Data

Apr. 2, 1992 [DE] Germany ............... 4210904
Jun. 5, 1992 [DE] Germany ............... 4218537
Nov. 25, 1992 [DE] Germany ............... 4239491

[51] Int. Cl.$^5$ ............... H01F 13/00; H01F 7/02; F16C 32/04
[52] U.S. Cl. ............... 335/284
[58] Field of Search ............... 335/284, 226, 245, 302, 335/306; 361/143, 149, 150, 151; 340/547, 551, 572

[56] References Cited

U.S. PATENT DOCUMENTS 3,585,549  6/1971  Muller ............... 335/284
5,200,729  4/1993  Soeda et al. ............... 335/284

Primary Examiner—Leo P. Picard
Assistant Examiner—Raymond M. Barrera
Attorney, Agent, or Firm—Harold Gell

[57] ABSTRACT

Described are magnetizing devices for permanent magnet rings that are bipolar on the end faces or multipolar on the lateral faces and have concentric North/South areas either on one of the two end faces or on their lateral faces. Magnetizing is performed by way of current pulses that are induced in annular current conductors arranged on the end faces or on the lateral faces of the permanent magnet rings.

36 Claims, 3 Drawing Sheets

5,374,915

MAGNETIZING DEVICE FOR PERMANENT MAGNET RINGS THAT ARE BIPOLAR ON THE END FACES OR MULTIPOLAR ON THE LATERAL FACES

BACKGROUND OF THE INVENTION

A. Field of The Invention

The invention relates to magnetizing devices for magnetic rings that are bipolar on the end faces or multipolar on the lateral faces, such as are used e.g. for magnetic bearings for rotating parts or for adhesive purposes.

B. Prior Art

It is known that such magnet rings or magnet systems that are bipolar on the end faces are assembled from two concentric rings. This requires the use of two different, exact-fitting rings with different diameters and also results in assembly difficulties since the rings must be pre-magnetized individually and must then be combined, e.g. by gluing.

SUMMARY OF THE INVENTION

The invention is based on the task of creating a magnetizing device that permits magnetizing of one-part magnet rings on their end face with two concentric poles or tubular multipolar permanent magnet rings on the lateral faces.

According to the invention, this task is solved for bipolar permanent magnet rings by closed annular current conductors arranged on one or both end faces of the permanent magnet ring to be magnetized and in which a current pulse whose magnetic field brings about the magnetization of the permanent magnet ring is induced.

A magnetizing device for a permanent magnet ring that is multipolar on the lateral faces, in contrast, is characterized by closed annular current conductors that are arranged on one or both lateral faces of the permanent magnet ring to be magnetized and in which a current pulse whose magnetic field brings about the magnetization of the permanent magnet ring is induced.

The secondary current pulse in the current conductor or conductors is generated according to the invention by the flux change of a primary current pulse in a primary pulse coil arranged inside the permanent magnet ring, whereby in the case of multipolar permanent magnets a primary current pulse is also generated in an exterior pulse coil that surrounds the permanent magnet ring.

BRIEF DESCRIPTION OF THE DRAWINGS

Preferred embodiments of the invention are shown diagrammatically in the drawing. In the drawing.

DETAILED DESCRIPTION OF THE PREFERRED EMBODIMENTS

The permanent magnet ring 1 to be magnetized preferably consists of a highly coercive permanent magnet material, such as AlNiCo, hard ferrite, or a rare earth alloy (samarium-cobalt, neodymium-iron-boron).

Figure 1:
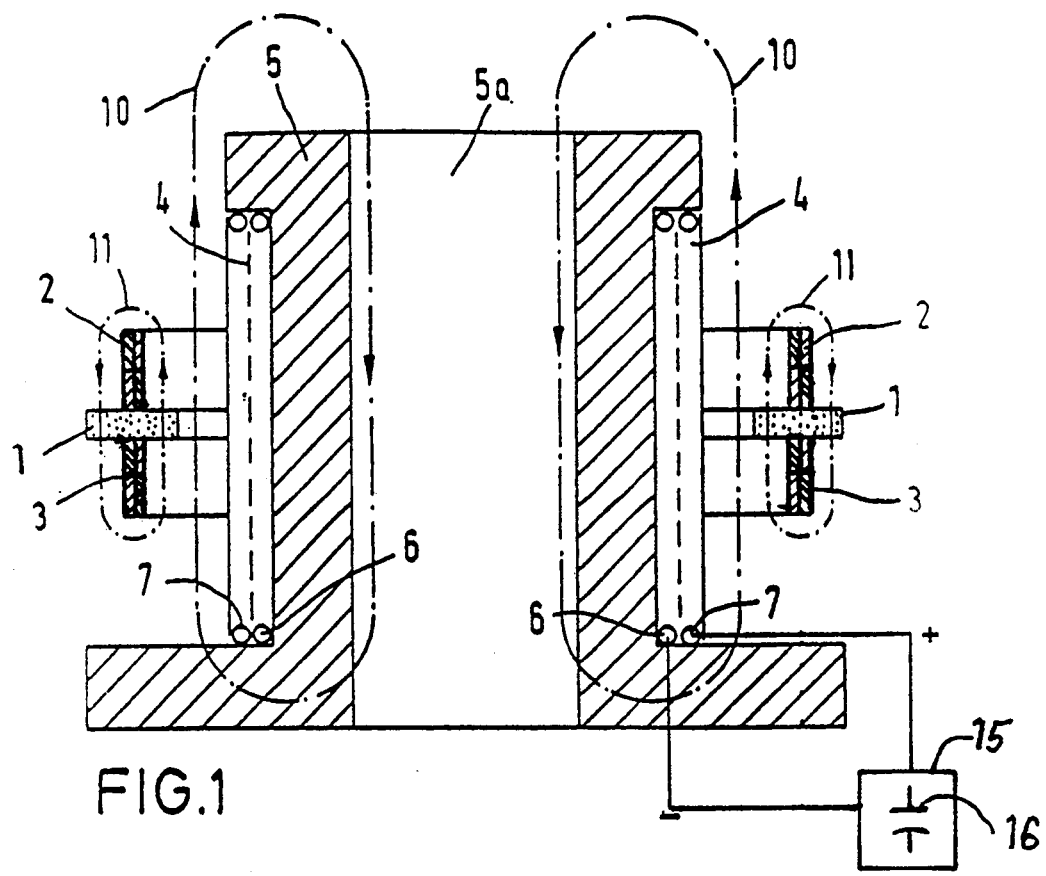
FIG. 1 shows a longitudinal section through a first embodiment of a magnetizing device in which a permanent magnet ring is arranged.
Figure 3:
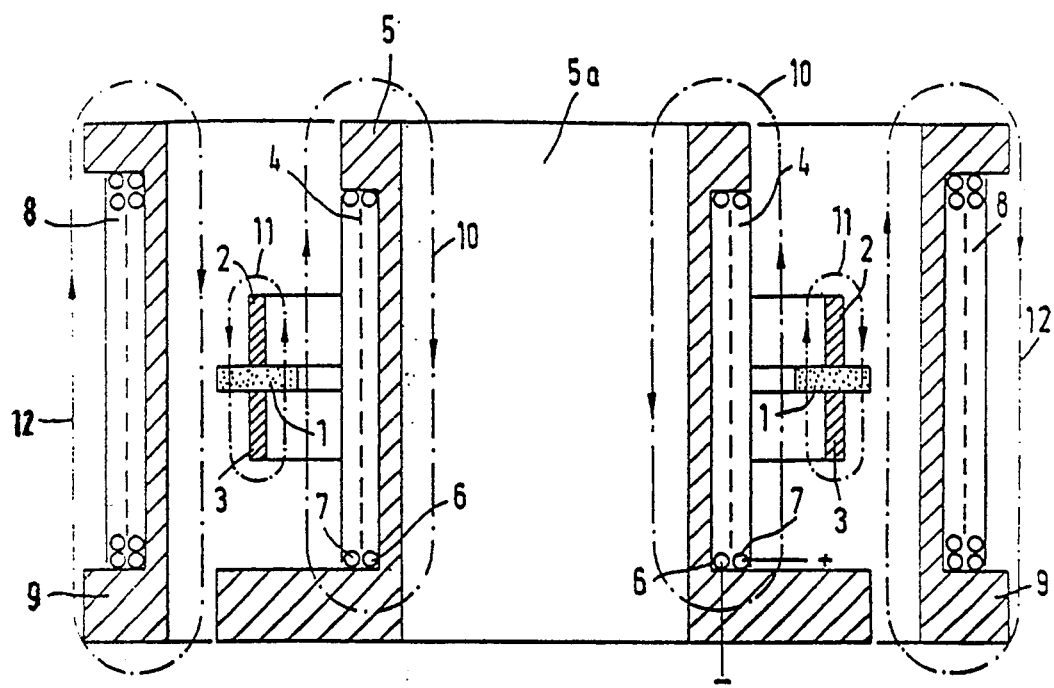
FIG. 3 shows a longitudinal section through a modified second embodiment of a magnetizing device for a bipolar permanent magnet ring.

Above and below the permanent magnet ring 1 in the magnetizing devices of FIG. 1 and FIG. 3 are two annular current conductors 2, 3 whose mean diameter corresponds approximately to that of permanent magnet 1. Inside the permanent magnet 1, a pulse coil 4 is arranged on a coil form 5, whereby the ends 6, 7 of said pulse coil can be connected to a pulse generator 15.

The permanent magnet ring 1 and the two annular current conductors 2, 3 are kept in the center coaxial position at the magnetizing device by holders (not shown) of a non-magnetic and non-conductive material.

In order to increase the magnetic flux 10 of the pulse coil 4, the latter may be equipped inside the hollow space 5a of coil form 5 with a core of a compounded or a solid iron circuit of the type of a transformer frame. A peak current pulse generator that utilizes the discharge current of a capacitor 16 is suitable for generating the magnetizing pulse in the primary pulse coil 4.

Figure 2:
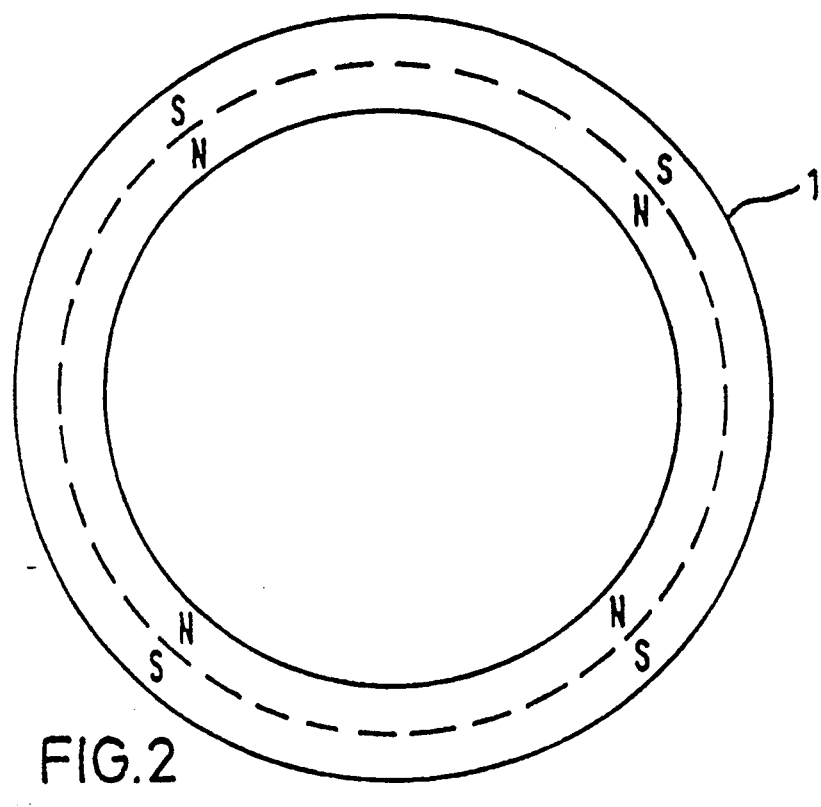
FIG. 2 shows a frontal view of the permanent magnet ring that is magnetized in a bipolar manner on the end faces.

FIG. 2 shows the view of a permanent magnet ring 1 magnetized on a device according to FIG. 1 between current conductors 2 and 3 by way of the magnetic flux 11 surrounding it. This permanent magnet ring has concentric poles designated with N and S. The neutral zone between poles N and S is drawn striated.

It may be advantageous to assemble the annular current conductors 2, 3 from several rings with smaller cross sections in order to prevent an increase in resistance due to skin effects.

The primary current pulse through the pulse coil 4 may be a sine half-wave or may, upon reaching the current maximum, follow an e-function.

In the embodiment of the magnetizing device shown in FIG. 3, an additional pulse coil 8 is added to the primary pulse coil 4, whereby this additional pulse coil concentrically surrounds the magnetizing device of FIG. 1 on a coil form 9 and fortifies the current induced in the two annular current conductors 2, 3 with its magnetic flux in such a way that the magnetization of the permanent magnet ring 1 is improved. The two pulse coils 4 and 8 are excited simultaneously by the pulse generator.

Figure 4:
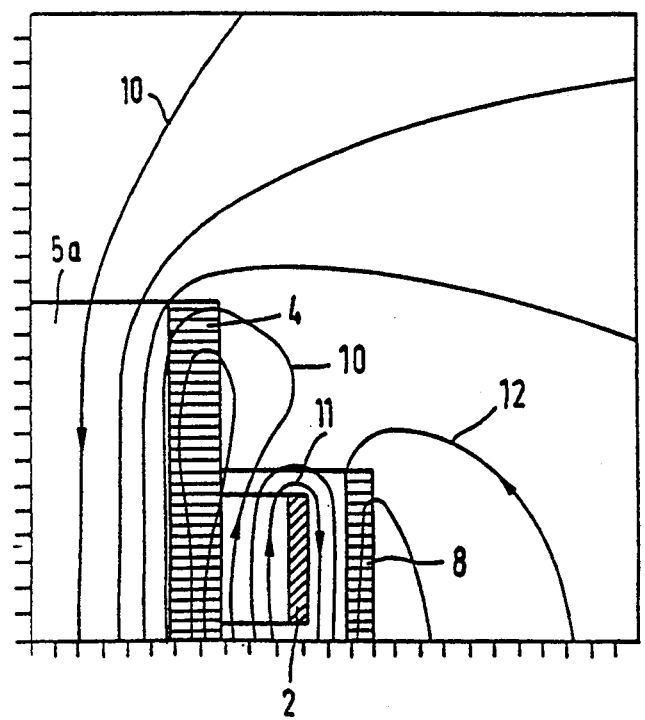
FIG. 4 shows a diagram of the behavior of the lines of the magnetic flux that are drawn in the top right quarter only in a simplified and diagrammatic manner by way of the two pulse coils of the magnetizing devices of FIG. 3.

The magnetic fluxes in the upper right quarter of the magnetizing device of FIG. 3 are shown only in a simplified and schematic manner. Their exact behavior is shown in FIG. 4. The magnetic fluxes 10 and 12 of the two pulse coils 4 and 8 and the magnetic flux 11 of the current induced in current conductor 2 superimpose each other so that the magnetic flux 10 of the pulse coil 4 appears to be displaced in the inside of the annular current conductor 2, and the magnetic flux 12 of the exterior pulse coil 8 appears to be displaced into the space between current conductor 2 and pulse coil 8.

Figure 5:
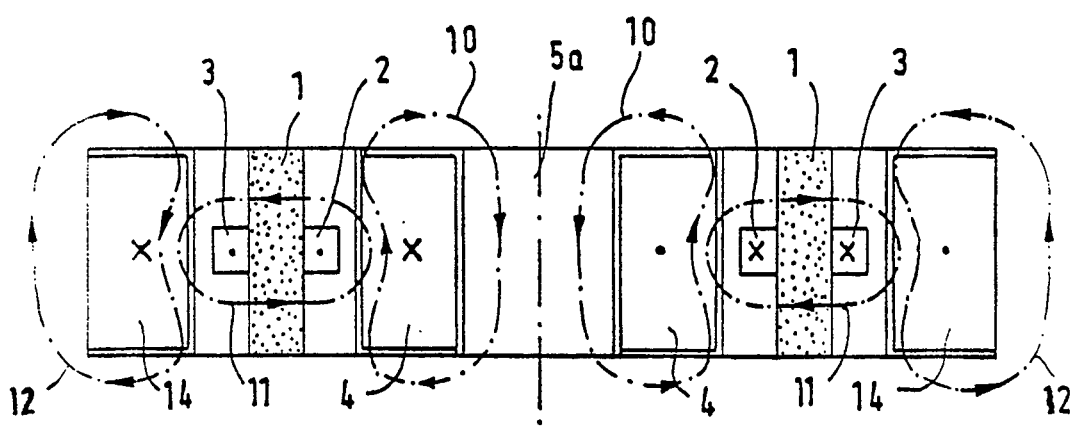
FIG. 5 shows a longitudinal section through a magnetizing device for a permanent magnet ring that is multipolar on the lateral faces and has interior and exterior pulse coils.

In the magnetizing device for a tubular permanent magnet ring 1 of FIG. 5 that is multipolar on the lateral faces, two each annular, concentric current conductors 2,3 that enclose the permanent magnet ring 1 between them are arranged inside and around the exterior of the permanent magnet ring, whereby an interior and an exterior pulse coil 4 or 14 whose ends can be connected to a pulse generator (not shown) are coordinated with each of them.

The permanent magnet ring 1 and the annular current conductors 2, 3 are kept in the center coaxial position at the magnetizing device by holders (not shown) of a non-magnetic and non-conductive material.

A peak current pulse generator that utilizes the discharge current of a capacitor is suitable for generating the magnetizing pulse in pulse coils 4 and 14.

For the remainder, the magnetizing device of FIG. 5 functions in exactly the same way as the two devices of FIG. 1 and FIG. 3.

Figure 6:
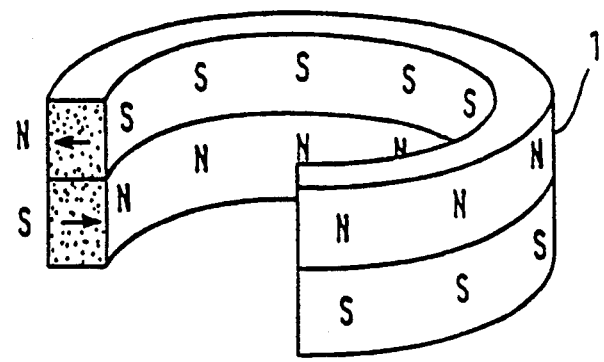
FIG. 6 shows a spatial diagrammatic, bursted view of a permanent magnet ring that is multipolar on the lateral faces and that has been magnetized in such a magnetizing device.

FIG. 6 shows a perspective view of a multipolar permanent magnet ring 1 that has been magnetized with a device of FIG. 5 between current conductors 2 and 3 with pulse coils 4 and 14 by way of the magnetic flux surrounding it. On the interior and exterior lateral faces, it has opposing poles that are designated with N and S and that alternate several times in the axial direction of the permanent magnet ring 1.

It may be advantageous in this device to also assemble the annular current conductors 2, 3 from several rings with smaller cross sections as illustrated in FIG. 1 in order to prevent an increase in resistance due to skin effects.

The primary current pulse through pulse coils 4, 14 may also be a sine half-wave here, or may, upon reaching the current maximum, follow an e-function.

In order to generate a multipolar magnetization on a tubular permanent magnet that is multipolar on the lateral faces and that consists of several coaxially consecutive multipolar magnet rings 1 that according to FIG. 6 have been oppositely polarized, whereby said tubular permanent magnet is magnetized in a magnetizing device of FIG. 5, the permanent magnet can be moved axially following each current pulse, or, it is possible to use a multiple arrangement of coaxial pulse coils 4, 14, and, of annular current conductors 2, 3 for magnetization.

We claim:

1. A device for magnetizing a permanent magnet ring so that it is bipolar on the end faces, comprising:
   closed annular current conductor means arranged on at least one of said end faces of said permanent magnet ring for generating a magnetic field which is induced in said permanent magnet ring; and
   a primary pulse coil arranged inside of said permanent magnetic ring for generating current pulses in said closed annular current conductor means for generating said magnetic field.

2. A magnetizing device according to claim 1, comprising:
   a capacitor, and
   said current pulses in said primary pulse coil are generated by the discharge of said capacitor.

3. A magnetizing device according to claim 1, characterized in that said current pulses begin as sine half-waves and upon reaching the current maximum, follow an e-function.

4. A magnetizing device according to claim 1, characterized in that said current conductor means comprises several rings.

5. A magnetizing device according to claim 1, characterized in that said current conductor means comprises several partial rings.

6. A magnetizing device according to claim 2, characterized in that said current pulses begin as sine half-waves and upon reaching the current maximum, follow an e-function.

7. A device for magnetizing a permanent magnet ring (1) that is bipolar on the end faces, comprising:
   closed annular current conductors (2, 3) arranged one on each of said end faces of said permanent magnet ring (1); and
   a current source for providing current pulses for energizing said closed annular current conductors.

8. A magnetizing device according to claim 7, comprising:
   a primary pulse coil (4) arranged inside said permanent magnet ring (1) for inducing current pulses in said closed annular current conductors (2, 3).

9. A magnetizing device according to claim 7, wherein said current source includes:
   a primary pulse coil (4);
   a discharge capacitor means (15) for generating said current pulses in said primary pulse coil (4).

10. A magnetizing device according to claim 7, characterized in that said current pulses begin as sine half-waves which upon reaching the current maximum, follow an e-function.

11. A magnetizing device according to claim 7, characterized in that said closed annular current conductors (2, 3) comprise several rings.

12. A magnetizing device according to claim 8, characterized in that said closed annular current conductors (2, 3) comprise several partial rings.

13. A magnetizing device according to claim 8, comprising:
   a discharge capacitor means (15) for generating said current pulses in said primary pulse coil (4).

14. A magnetizing device according to claim 13, characterized in that said current pulses begin as sine half-waves which upon reaching the current maximum, follow an e-function.

15. A magnetizing device according to claim 7, comprising:
   a pulse coil driven by said current source for providing said current pulses;
   an additional pulse coil (8) that surrounds the outside of said permanent magnet ring (1) and is energized by said current source so that the current induced in said closed annular current conductor (2) by said pulse coil is fortified.

16. A magnetizing device according to claim 15, characterized in that the field intensities on the insides and outsides of said closed annular current conductors (2, 3) are approximately identical.

17. A magnetizing device according to claim 7, characterized in that said closed annular current conductors generate field intensities that are sufficient to saturate the magnetic material of said permanent magnet ring (1).

18. A magnetizing device according to claim 8, characterized in that the field intensities generated by said closed annular current conductors are at least sufficient to saturate the magnetic material of said permanent magnet ring (1).

19. A magnetizing device according to claim 12, characterized in that the field intensities generated by said closed annular current conductors are at least sufficient to saturate the magnetic material of said permanent magnet ring (1).

20. A magnetizing device according to claim 13, characterized in that the field intensities generated by said closed annular current conductors are at least sufficient to saturate the magnetic material of said permanent magnet ring (1).

21. A magnetizing device according to claim 16, characterized in that the field intensities generated by said closed annular current conductors are at least sufficient to saturate the magnetic material of said permanent magnet ring (1).

22. A device for magnetizing a permanent magnet ring (1) that is bipolar on the end faces, comprising:
    closed annular current conductors (2, 3) arranged one on each end face of said permanent magnet ring (1);
    a primary pulse coil (4) arranged inside said permanent magnet ring (1), whereby said primary pulse coil induces current pulses in one or more of said current conductors (2, 3); and
    a second pulse coil (8) arranged outside said permanent magnet ring (1), whereby said second pulse coil induces current pulses in one or more of said current conductors (2, 3) in phase with said current pulses induced by said primary pulse coil.

23. A magnetizing device according to claim 22, characterized in that the said current pulses induced by said primary pulse coil (4) are initially a sine half-wave which upon reaching the current maximum, is distorted to follow an e-function.

24. A magnetizing device according to claim 23, characterized in that the said current pulses induced by said second pulse coil (8) are initially a sine half-wave which upon reaching the current maximum, is distorted to follow an e-function.

25. A magnetizing device according to claim 24, characterized in that said current pulse in said primary pulse coil (4) is generated by the discharge of a capacitor.

26. A magnetizing device according to claim 24, characterized in that said current pulse in said second pulse coil (8) is generated by the discharge of a capacitor.

27. A magnetizing device according to claim 24, characterized in that said closed annular current conductors (2, 3) consist of several rings.

28. A magnetizing device according to claim 24, characterized in that the field intensities on the insides and outsides of said closed annular current conductors (2, 3) are approximately identical.

29. A magnetizing device according to claim 24, characterized in that the field intensities are at least sufficient to saturate the magnetic material of said permanent magnet ring (1).

30. A device for magnetizing a permanent magnet ring that is multipolar on the lateral faces, comprising:
    closed annular current conductor means arranged on at least one lateral face of said permanent magnet ring for generating magnetic field intensities which cause the magnetization of said permanent magnet ring with reversing polarity along axial parallel lines on the circumference of said permanent magnet ring; and
    a current source energizing said closed annular current conductor.

31. A magnetizing device according to claim 30, comprising:
    first and second pulse coils respectively arranged in the interior and around the exterior of said permanent magnet ring, whereby said first and second pulse coils generate a current pulse in said closed annular current conductor means for causing said closed annular current conductor means to generate said magnetic field intensities.

32. A magnetizing device according to claim 31, characterized in that said current pulse is generated by the discharge of a capacitor.

33. A magnetizing device according to claim 31, characterized in that said current pulses begin as sine half-waves which upon reaching the current maximum, follow an e-function.

34. A magnetizing device according to claim 31, characterized in that said closed annular current conductor means is comprised of several rings.

35. A magnetizing device according to claim 31, characterized in that the field intensities on the insides and outsides of said closed annular current conductor means are approximately identical.

36. A magnetizing device according to claim 31, characterized in that said field intensities are at least sufficient to saturate the magnetic material of said permanent magnet ring to be magnetized.

* * * * *